United States Patent [19]

Cavalli

[11] 4,219,318
[45] Aug. 26, 1980

[54] APPARATUS FOR PREPARING FRESH FARINACEOUS PASTES

[76] Inventor: Alfredo Cavalli, 9 via Galileo Galilei, Pessano con Bornago, Milan, Italy

[21] Appl. No.: 10,089

[22] Filed: Feb. 7, 1979

Related U.S. Application Data

[63] Continuation-in-part of Ser. No. 798,144, May 18, 1977, abandoned.

[30] Foreign Application Priority Data

May 19, 1976 [IT] Italy ................................ 23392 A/76

[51] Int. Cl.³ .......................... B29B 1/06; B01F 7/18
[52] U.S. Cl. ..................................... 425/190; 366/98; 366/309; 366/314; 425/197; 425/205
[58] Field of Search ....................... 425/190, 197, 205; 366/77, 80, 69, 91, 98, 97, 99, 309, 311, 314

[56] References Cited

U.S. PATENT DOCUMENTS

| 1,345,542 | 7/1920 | Hartshorn ............................. 366/311 |
| 2,026,667 | 1/1936 | Braibanti et al. ...................... 425/205 |
| 2,844,110 | 7/1958 | Braibanti et al. ...................... 425/190 |
| 3,355,152 | 11/1967 | Otto ..................................... 366/314 |
| 3,963,220 | 6/1976 | Ohchi ..................................... 366/98 |

FOREIGN PATENT DOCUMENTS

| 453614 | 5/1925 | Fed. Rep. of Germany ........... 425/205 |
| 564422 | 10/1957 | Italy ......................................... 425/205 |
| 16891 | of 1911 | United Kingdom ..................... 425/205 |

*Primary Examiner*—Jeffery R. Thurlow
*Attorney, Agent, or Firm*—Hubbell, Cohen, Stiefel & Gross

[57] ABSTRACT

In an apparatus for preparing fresh food paste of the type including a vessel having a bottom and forming a mixing and kneading chamber, the vessel having a closed side wall of circular cross section which is symmetrical about an axis passing centrally through the chamber, a rotatable member mounted within the chamber for rotation about the vertical axis, a drive for rotating the member in a given direction, blades located within the chamber and operatively connected to the rotatable member in a position extending away from the vertical axis, wherein the improvement comprises: the blades including a kneading blade extending into close confronting space relation with the vessel side wall and having a lower surface with leading and trailing edges defined by the given direction of rotation, the trailing edge having a normal position adjacent the vessel bottom and being moveable away from the bottom and the leading edge being positioned at a substantially greater distance from the bottom than the normal position of the trailing edge; and a device for biasing the trailing edge towards the vessel bottom for causing the kneading blade to exert downward pressure on paste forming ingredients between the kneading blade's lower surface and the vessel bottom during the rotation of the rotatable member to effect the kneading of those ingredients.

23 Claims, 16 Drawing Figures

APPARATUS FOR PREPARING FRESH FARINACEOUS PASTES

This application is a continuation-in-part of patent application Ser. No. 798,144, filed May 18, 1977, now abandoned for KITCHEN UTENSIL FOR PRODUCING FARINACEOUS PRODUCTS.

FIELD OF THE INVENTION

This invention relates in general to mixing apparatuses having rotatable mixing means located therein and in particular to such mixing apparatuses as are used for preparing fresh food pastes.

BACKGROUND OF THE INVENTION

In the past, persons wishing to produce thick farinaceous pastes, such as those used for various types of pasta, were faced with a laborious mixing and kneading task. Unlike thinner pastes or dough for bread or cake which can be handled with a simple mixer, thicker pastes require a more extensive working or kneading in order to create a homogeneous mixture. On the industrial level, machinery has been developed which can mix various thick pastes. In the area of pasta making, these machines are often combined with extruders which force the prepared paste through apertures in a die plate to form the paste into the desired shape. Unfortunately, these large volume industrial machines cannot be used in a domestic setting for producing the customarily smaller amounts of paste. Various other devices exist for shaping the paste once it has been produced and some of these are easily adaptable for small scale use. Thus far however, an inexpensive machine has not been constructed which can properly knead thick farinaceous pastes in small volumes.

SUMMARY OF THE INVENTION

Accordingly, the present invention includes an apparatus for preparing fresh food pastes from paste forming contents, which may be adapted to small volume domestic use. The apparatus of the present invention is of the type including a vessel having a bottom and forming a mixing and kneading chamber, the vessel having a closed side wall of circular cross section which is symmetrical about a vertical axis passing centrally through the chamber, a rotatable member mounted within the chamber for rotation about the axis, drive means for rotating the member in a given direction, blade means located in the chamber and means operatively connecting the blade means to the rotatable member in a position extending away from the vertical axis, with the improvement comprising: the blade means including a kneading blade extending into close confronting spaced relation with the side wall and having a lower surface with leading and trailing edges defined by the rotation in a given direction, the trailing edge having a normal position adjacent the bottom of the vessel and being moveable away from the bottom and the leading edge being positioned at a substantially greater distance from the bottom than the normal position of the trailing edge; and means for biasing the trailing edge towards the vessel bottom for causing the kneading blade to exert downward pressure on paste forming contents between the lower surface and the vessel bottom during the rotation of the rotatable member to effect the kneading of the paste forming contents. Optionally, the means operatively connecting the blade means to the rotatable member includes an elongated support member operatively connected to the rotatable member in a position radially extending away from and perpendicular to the vertical axis, and means rotatably mounting the kneading blade on the elongated support member. Also, the apparatus may optionally include means forming an extrusion chamber beneath the vessel bottom with the bottom having a discharge port located therein off of the vertical axis for allowing the kneading blade to push paste forming contents from the mixing and kneading chamber into the extrusion chamber.

BRIEF DESCRIPTION OF THE DRAWINGS

The present invention is described below with respect to the appended drawings in which.

DETAILED DESCRIPTION OF DRAWINGS

Figure 1:
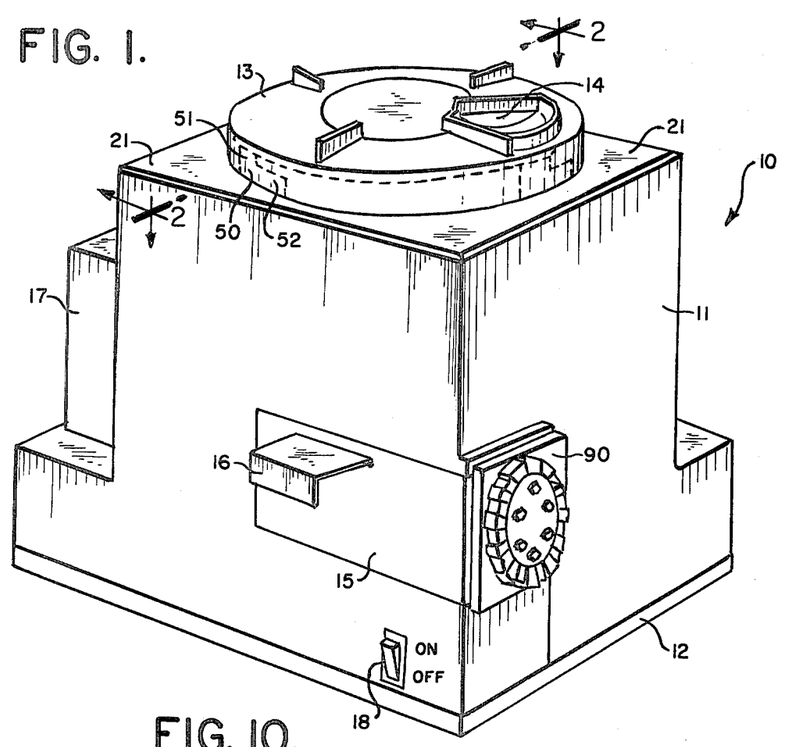
FIG. 1 is a perspective view of one embodiment of the present invention.

FIG. 1 shows an apparatus 10, according to the present invention, for preparing fresh food pastes. The apparatus 10 includes a housing 11 having a base 12. A mixing and kneading chamber is accessible through the removable cover 13 for initially charging said chamber with paste forming ingredients and through an inlet 14 in the cover 13 for adding ingredients during the operation of the apparatus. The apparatus 10 also includes extrusion means 15 mounted on the side of the housing 11. A closure means 16 is provided for separating the mixing and kneading chamber from the extrusion means 15. A portion 17 of the housing 11 encloses a motor and gear means for operating the apparatus. An electrical switch 18 is mounted on the housing 11 for turning the apparatus on and off.

Figure 2:
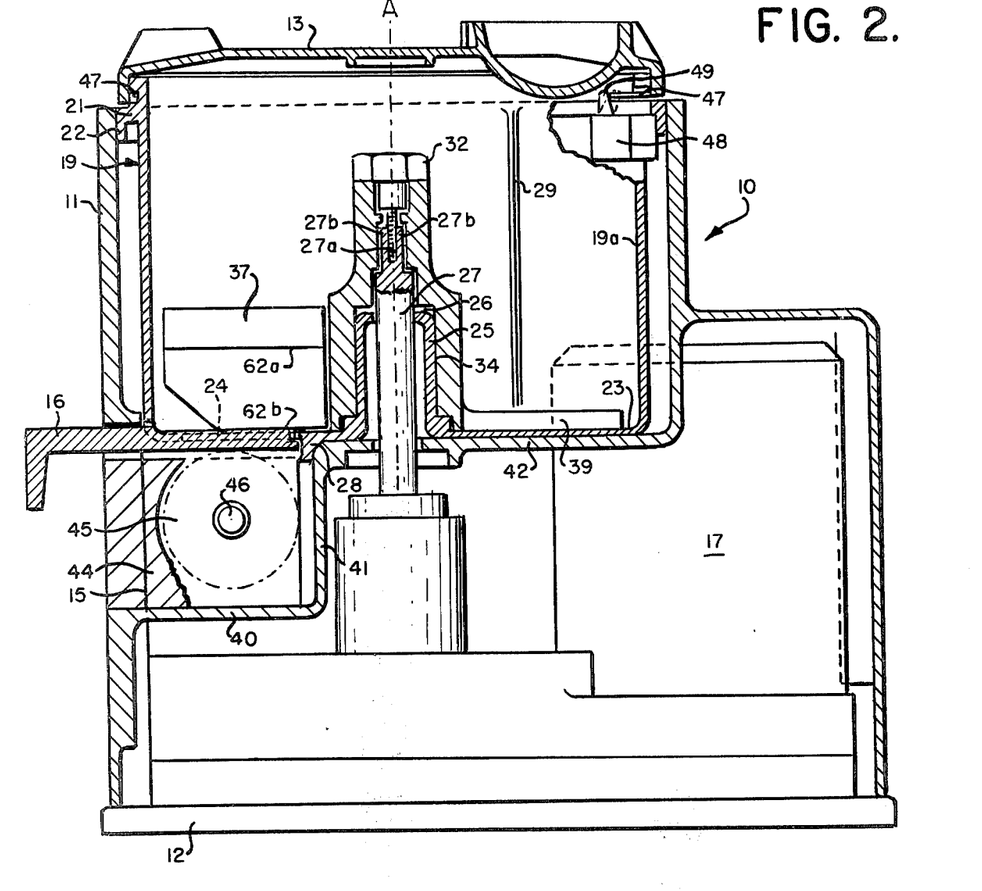
FIG. 2 is a partially sectioned view of the apparatus of FIG. 1 taken along view lines 2—2.

FIG. 2 is a partially sectioned view of the apparatus 10 of FIG. 1 taken along view line 2—2. FIG. 2 shows the housing 11 having a vessel 19 located therein for forming a mixing and kneading chamber 20. The vessel 19 preferably has a closed side wall 19a with a circular cross-sectional shape symmetrical about a vertical axis A passing vertically through the chamber 20. In this case, the vessel 19 is cylindrical and includes an outwardly radially extending flange 21 for closing the space between the circular cross-sectional vessel 19 and the rectangular top of the housing 11. A downwardly extending flange 22 is located along the perimeter of the flange 21 for further interfacing with the housing 11. The closure thus created between the flange 21 and the top of the housing 11 prevents the introduction of substantial amounts of mixing ingredients into the interior of the housing during the use of the apparatus 10.

The vessel 19 includes a flat bottom 23 having a discharge port 24 located therein for allowing the passage of mixed and kneaded ingredients into the extrusion means 15. An upwardly extending cylindrical protrusion 25 is formed in the bottom of the vessel 19, giving the flat portion 23 thereof an annular shape. A hole 26 is located in the top of the cylindrical protrusion 25 for allowing the extension of a rotatable member 27 into the mixing and kneading chamber 20. The cylindrical protrusion 25 thus raises the entry hole 26 of the rotatable member 27 up from the bottom 23 of the vessel 19 to aid in preventing the introduction of mixing ingredients into the operating mechanics of the apparatus 10. The bottom 23 of the vessel 19 also includes a downwardly extending flange 28 for interfacing the mixing and kneading chamber 20 with the extrusion means 15 to further prevent the introduction of mixing ingredients into the interior of the housing 11. The inside surface of the vessel 19 includes longitudinal protrusions 29 which aid in the mixing of ingredients. The protrusions 29 may have any suitable cross sectional shape, such as a semi-circle. The function of the protrusions 29 is further described below.

A blade means assembly 30 is mounted on the rotatable member 27 which extends concentrically into the mixing and kneading chamber 20. The rotatable member 27 includes a metallic shaft 31 having a threaded hole 27a located in the extended end thereof for allowing a thumbscrew 32 to be used for removably securing the blade means assembly 30 thereto. The extended end of the shaft 31 also includes two identical diametrically opposed flats 27b formed on the outer surface thereof for engaging the assembly 30 to transmit rotational force thereto.

The blade means assembly 30 includes a concentric base formed therein and having four sections 34, 35, 36 and 36a. The section 34 surrounds the cylindrical protrusion 25. The section 35 has a smaller diameter than section 34 and closely surrounds the end of the shaft 31. The section 36 has diametrically opposed flat sections complimentary to and engageable with the flats 27b of the shaft 31. The section 36 is a small circular bore for allowing engagement of the thumbscrew 32 with the threaded hole 27a. The section 36a is larger than the circular bore 36 and generally conforms to the size of the thumbscrew 32. The thumbscrew 32 allows the assembly 30 to be removed from the apparatus 10 for cleaning purposes. With the assembly 30 thus removed, the vessel 19 may also be removed for cleaning by moving it vertically upward from its position in the housing 11. The portions 40–43 of the housing 11 prevent the introduction of foreign material into the motor and drive means 17 of the apparatus 10 when either the vessel 19 or the extrusion means 15 is removed therefrom. Various blades 37 and 39 extend radially outward away from the vertical axis of the chamber 20 for performing various functions in the mixing and kneading chamber 20. The blades 37 and 39 are described below with respect to other figures.

While the extrusion means 15 may be of any type, I prefer one which includes an extruder housing 44 forming an extrusion chamber 45. A drive shaft 46, extends centrally into the extrusion chamber 45 for driving an extrusion mechanism (not shown). The extruder housing 44 is designed to be removable from the housing 11 by lateral movement of the extruder housing 44 from right to left as shown in FIG. 2. The extruder housing 44 can thus be more easily and effectively cleaned.

As mentioned, a portion 17 of the housing 11 includes a motor and gear means for operating the apparatus. This motor and gear means is used to simultaneously turn the drive shaft 31 for the rotatable member 27 and the drive shaft 46 for the extrusion mechanism. Any suitable arrangement for producing the rotation of the shafts 31 and 46 may be used. One such arrangement is described below with reference to FIG. 12.

FIG. 2 also shows the cover 13 for the vessel 19. The cover 13 is secured to the vessel 19 by a plurality of lock members 47 which protrude radially inwardly from a peripheral vertical portion of the cover 13. A safety switch 48 is shown in functional cooperation with the cover 13 behind a cutout portion of the wall 19a. The switch 48 includes a movable lever 49 extending from the top thereof and through the horizontal flange 21. The lever 49 is engaged by a latch member 47 extending from the cover 13. FIG. 1 shows, in phantom lines, a typical groove 50 located at the top of the vessel 19 on the outside thereof and which is engageable by the lock members 47. When the cover 13 is placed on the vessel 19, the lock members 47 enter the portion 51 of the groove 50 as the cover 13 is lowered. The cover 13 is then rotated counterclockwise to move the lock members 47 into the portion 52 of the groove 50. When the cover 13 is properly located over the vessel and rotated, the switch 48 is activated to allow power to be connected to the motor of the apparatus. Thus, as a safety feature, the motor cannot be activated unless the cover 13 is properly in place.

Figure 3:
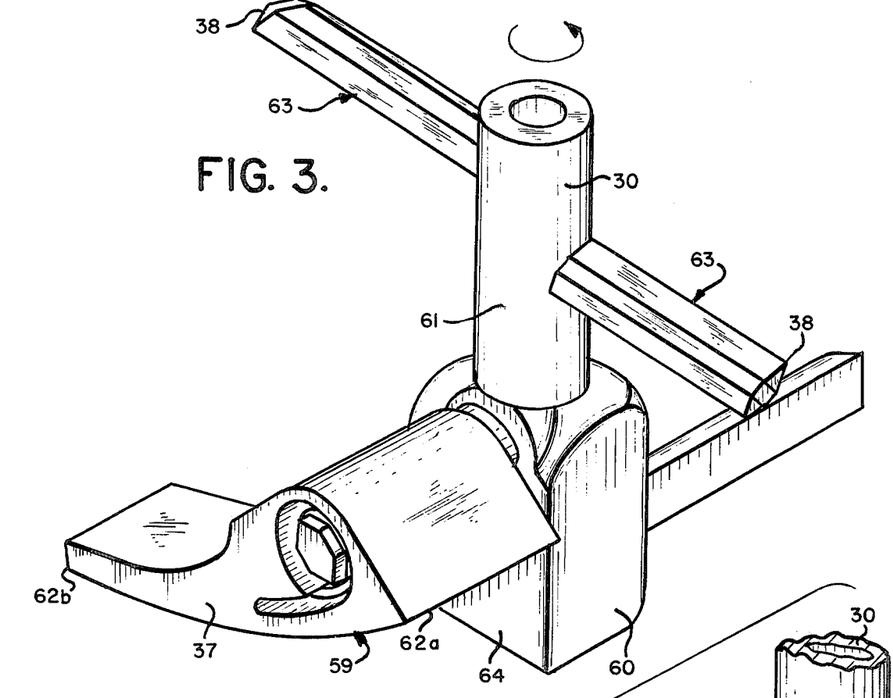
FIG. 3 is a perspective view of a blade means assembly suitable for use with the embodiments of FIGS. 1 and 2.

FIG. 3 is a perspective view of a blade means assembly 30 which is suitable for use in the apparatus 10. The blade means assembly 30 has a lower portion 60 and an upper portion 61 of reduced diameter. A kneading blade 37 is part of the assembly 30 and is operatively connected to the lower portion 60 and extends radially away therefrom. When the assembly 30 is operatively connected to the rotatable member 27 the kneading blade thusly extends away from the vertical axis A extending centrally through said chamber 20. In reference to FIGS. 2 and 3, the kneading blade 37 includes a lower surface 59 having a leading edge 62a and a trailing edge 62b defined by the direction of rotation of said assembly 30. The trailing edge 62b is normally positioned adjacent to the bottom 23 of the vessel 19 and is moveable upwardly away from the bottom 23. The leading edge 62a is positioned at a substantially greater distance from the bottom 23 than the normal position of the trailing edge 62a. The kneading blade 37 extends from the lower portion 60 into close confronting spaced relation with the side wall 19a and the protrusions 29 which thereby cooperate with the kneading blade 37 to prepare the paste forming contents.

The blade means assembly 30 of FIG. 3 also includes mixing blades 38 mounted on the upper portion 61 and extending outwardly therefrom. The mixing blades 38 are generally mounted perpendicular to the axis of rotation of the assembly 30, the vertical axis A of the chamber 20, and each has a lower surface 63 facing partially downward and partially in the direction of rotation of the assembly 30. The mixing blades 38 extend outwardly to almost touch the longitudinal protrusions 29 around the interior wall of the vessel 19 thereby placing the ends of the mixing blades 38 in close confronting spaced relation with the inner wall of the vessel 19. Thus, the blades 38 and the protrusions 29 are able to cooperate in mixing the paste 30 of FIG. 3. The lower portion 60 of the assembly 30 has a side 64 thereof forming a flat surface. A support member 65 extends perpendicularly from the surface 64. Upon installation of the assembly 30 into the vessel 19, the support member 65 is horizontally oriented and thus extends radially away from and perpendicular to the vertical axis of the chamber 20. The support member 65 includes an inner portion 66 and an outer portion 67 of reduced diameter. An outwardly facing annular surface 68 is formed between the portion 66 and 67 of the support member 65. A hole 69 is located in the surface 68. A threaded bore 60 is formed in the end of the support member 65. The kneading blade 37 has a generally flat diagonally facing surface 71. A portion 72 of the kneading blade 37 is enlarged to accommodate a cylindrical bore 73 formed therein. The bore 73 is just slightly larger than the inner portion 66 of the support member 65 to allow rotatable mounting of the kneading blade 37 on the support member 65. A helical spring 74 is used for rotatably biasing the kneading blade 37 on the support member 65. The helical spring 74 biases the trailing edge 62b downwardly or towards the bottom 23. The outer diameter of the helical spring 74 is smaller than the diameter of the bore 73 and the inner diameter of the helical spring 74 is larger than the outer portion 67 of the support member 65. Thus, with the kneading blade 37 mounted on the support member 65, the helical spring 74 can be located within the bore 73 and around the exterior portion 67 of the support member 65. The helical spring 74 has a longitudinally bent end 75 designed to be located in the hole 69, and a tangentially directed end 76 designed to be engaged by a groove 77 formed in the side of the kneading blade 37 and in communication with the bore 73. Thus, the helical spring 74 can rotatably bias the kneading blade 37 on the support member 65. The helical spring 74 is held in place by a washer 78 which abuts the end of the support member 65 and is in turn held in place by a bolt 79 engaging the threaded bore 70 in the end of the support member 65. The assembly 30 also includes a stop means 80 formed on the flat side 64 of the lower portion 60. The stop means 80 limits the counter-clockwise spring biased rotation of the kneading blade 37 to locate the lower trailing edge 62 thereof at its normal position adjacent to or almost touching the bottom 23 of the vessel 19 when the blade means assembly 30 is secured to the rotatable member 27.

Figures 4, 5:
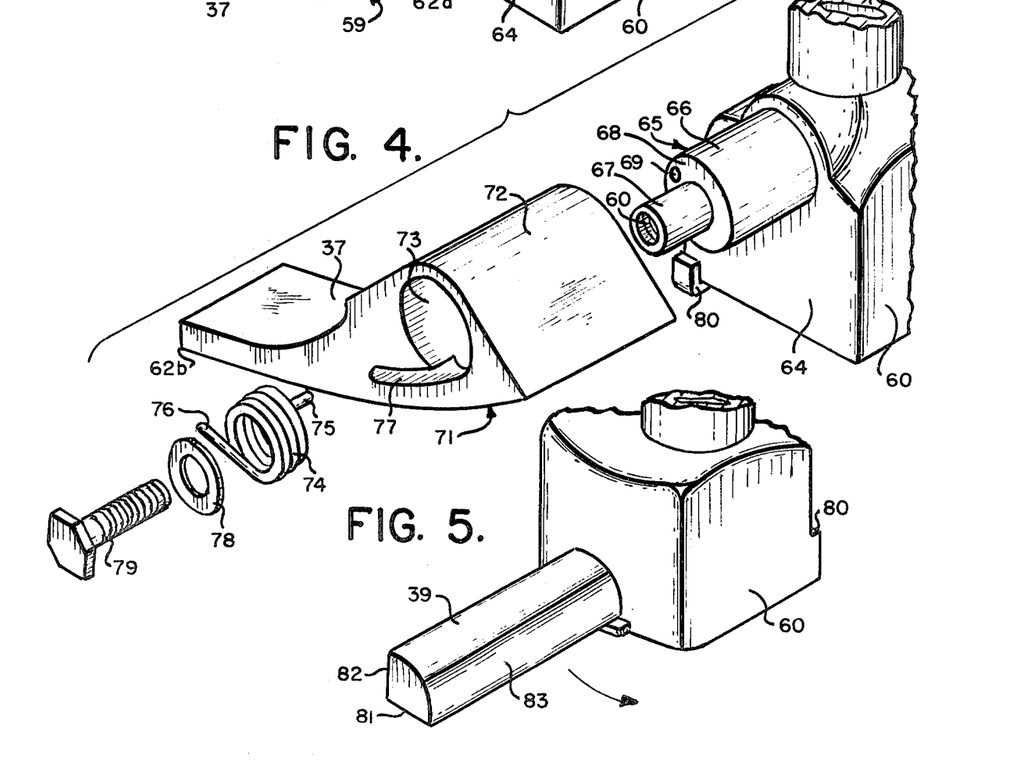
FIG. 4 is a partial perspective view of the blade means assembly of FIG. 3 in disassembled condition.
FIG. 5 is a partial perspective view of another portion of the blade means assembly of FIG. 3.

The scraper blade 39 includes flat, bottom and rear sides 81 and 82 and a curved front and top side 83. As the assembly 30 rotates in a counter-clockwise direction, as indicated by the arrow of FIG. 5, the scraper blade 39 moves ingredients closest to the bottom 23 of the vessel 19 upwardly, away from the bottom 23. If any lumps of ingredients stick to the bottom 23, the scraper blade 39 removes them during its rotation.

Figure 6:
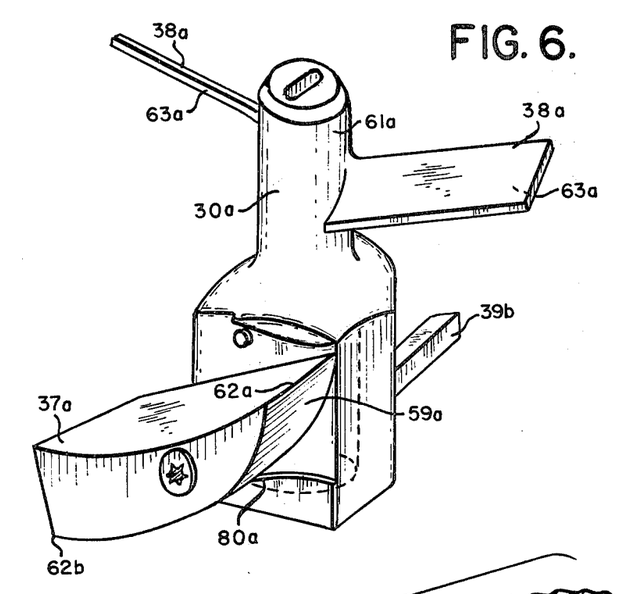
FIG. 6 is a perspective view of another blade means assembly suitable for use with the apparatus of FIGS. 1 and 2.

FIG. 6 shows a perspective view of modified assembly 30a which is capable of being used with the apparatus 10. Similar to the assembly 30 of FIG. 3, the asembly 30a includes a kneading blade 37a having a lower surface 59a with a leading edge 62a and a trailing edge 62b defined by the direction of rotation of the assembly 30a. The trailing edge 62b is designed to have a normal position adjacent to the bottom 23 of the vessel 19 when the assembly 30a is secured to the rotatable member 27. With respect to this normal position of the trailing edge 62b, the leading edge 62a is designed to be positioned at a substantially greater distance from the bottom 23. The kneading blade 37a also extends into close confronting spaced relation with the side wall 29a. The assembly 30a also includes mixing blades 38a affixed to the upper portion 61a thereof. The mixing blades 38a include surfaces 63a which face partially downward and partially in the direction of rotation of the assembly 30a. The mixing blades 38a differ from the mixing blades 38 in that the former are mounted at an acute angle with the assembly 30a so that they extend generally upwardly and outwardly with respect to the assembly 30a and the vertical axis of the chamber 20. The lower surface 59a of the kneading blade 37a differs from that of the kneading blade 37 in that the former surface 59a curves away from the bottom 23 of the mixing chamber 20 as it extends in the direction away from the trailing edge toward the leading edge 62a.

Figure 7:
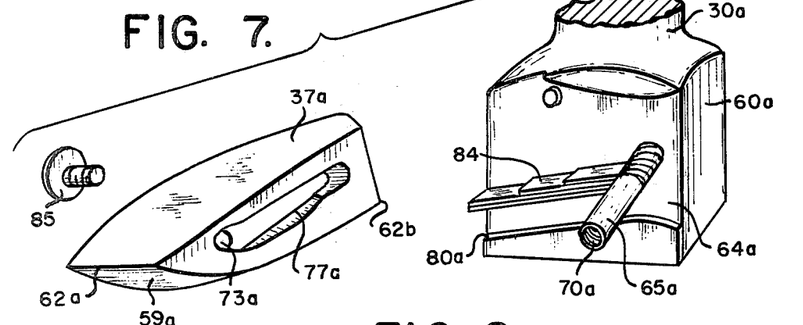
FIG. 7 is a partial perspective view of the blade means assembly of FIG. 6 in disassembled condition.

As may be seen in FIG. 7, at least one side, 64a, of the lower portion 60a of the assembly 30a is formed into a flat surface. A support member 65 is positioned in a manner so that when the assembly 30a is mounted in the mixing and kneading chamber 20 and secured to the rotatable member 27, the support member 65a extends radially outwardly from the assembly 30a and from the vertical axis A of the chamber 20. The support member 65a has a spring means in the form of a leaf spring 84. A threaded bore 70a is located in the end of the support member 65. The kneading blade 37a has a bore 73a located therethrough for insertion of the support member 65a. A groove 77a formed in the side of the kneading blade 37b is in communication with the bore 73a so that when the kneading blade 37a is mounted on the support member 65a, the leaf spring 84 is located in the groove 77a. A screw or bolt 85 is engageable with the threaded bore 70a for securing the kneading blade 37a on the support member 65a. In this manner, the kneading blade 37a is rotatably mounted on the support member 65a with the lead spring 84 rotationally biasing the kneading blade 37a to push the lower trailing edge 62b towards the bottom 23 of the vessel 19. The lower portion 60a of the assembly 30a also includes a stop means 80a for limiting the biased rotational movement of the kneading blade 37a to position the lower trailing edge 62a at a point where it is adjacent the bottom 23 of the vessel 19.

Figure 8:
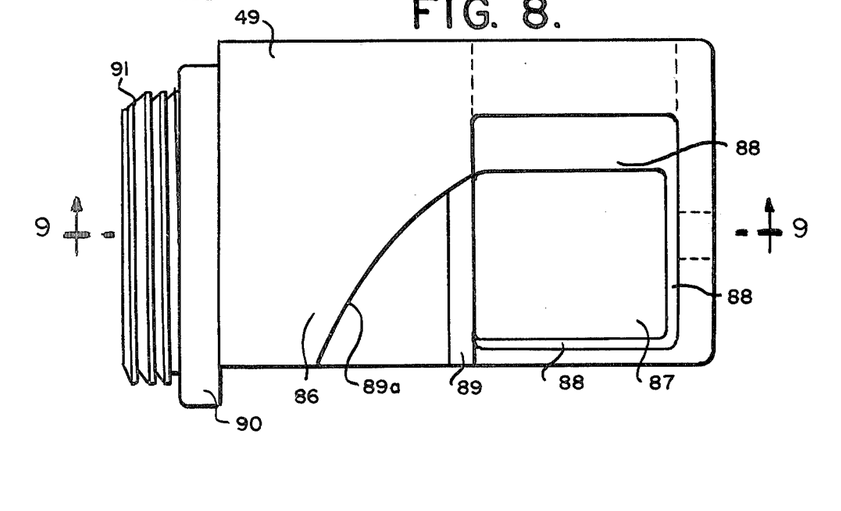
FIG. 8 is a top view of an extrusion housing for the apparatus of FIGS. 1 and 2.

FIG. 8 shows a top view of the extrusion housing 44. Otherwise shown in position in the housing 11 in FIG. 2. The extrusion housing 44 includes a box like body 86 having a top opening 87 located at one end thereof for receiving mixed and kneaded ingredients from the mixing and kneading chamber 20. The opening 87 is generally rectangular and includes an inwardly facing flange 88 located on three sides of the opening. The flange 88 supports the closure member 16 when the member 16 is located between the extrusion housing 44 and the vessel 19. The top of the extrusion housing 44 also includes a lower surface portion 89 for abutting with the bottom surface of the bottom 23 of the vessel 19 and a curved laterally facing surface 89a for abutting with the bottom surface of the bottom 23 of the vessel 19 and a curved laterally facing surface 89a for abutting the side of the vessel 19 when both the vessel 19 and the extrusion housing 44 are mounted in the apparatus housing 11. Thus, the bottom is supported over the extrusion housing 44 against the downward kneading force from the kneading blade 37 and the orientation of the opening 87 with respect to the discharge port is insured. The front or left-hand side of the extrusion housing 44, as shown in FIG. 8, includes a rectangular flange 80 for abutting the outside of the apparatus housing 11 as shown in FIG. 1. A threaded cylindrical section 81 extends outwardly from the flange 90 for allowing the mounting of an extrusion die means.

Figure 9:
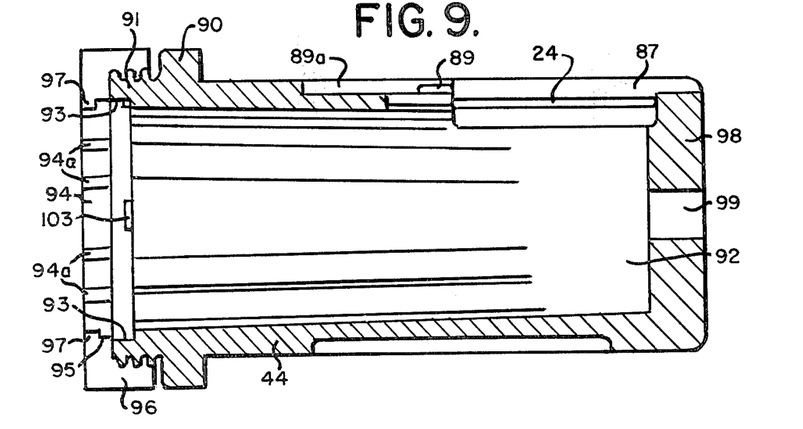
FIG. 9 is a sectioned side view of the housing of FIG. 8.

Referring now to FIG. 9, a large cylindrical bore 92 extends through the extrusion housing 44 and is in communication with the opening 87 in the top thereof. A larger but shallow bore 93 is located within the cylindrical extension 91 concentric with the bore 92. The shallow bore 93 allows for the mounting of an extrusion die plate 94 at that end of the extrusion housing 44. An annular collar 96, having threads engageable with the threads on the cylindrical extension 91, also has an inwardly extending flange 97 engageable with an annular surface 95 of the die plate 94 for pressing the die plate 94 into the bore 93. The die plate 94 may optionally include keyways, designated generally as 94b, engageable with complementary keyway guides along the inside of the bore 93 for preventing rotation of the die plate. The die plate 94 has an aperture or apertures 94a, in communication with the extrusion chamber, through which the paste is forced to form it into the desired shape. Interchangeable die plates having differently shaped apertures are preferably provided to allow the operator to change the shape of the product to be produced. In the apparatus described, the die plates may be interchanged by simply unscrewing the collar 96, changing the die plate and replacing the collar 96.

Figure 10:
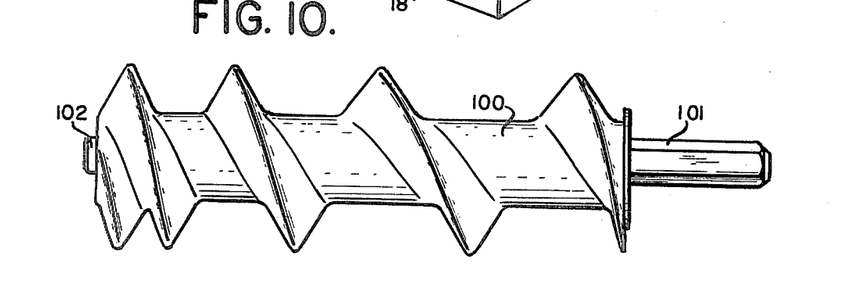
FIG. 10 is a side view of a feed screw used in conjunction with the housing of FIGS. 8 and 9.

As shown, and as preferred, the extruder is of the feed screw type, although other types of extruders may be employed. The feed screw 100 shown in FIG. 10 is rotatably mounted within the bore 92 and is designed to force or push mixed and kneaded ingredients trapped between the thread and the wall of bore 12 from the opening 87 of the extrusion housing 44 to the other end of that housing and through aperature 94a in the die plate 94. When installed in the housing 44, the screw 100 has a drive shaft 101 which extends through the bore 99 at the rear of the housing 44. The other end of the feed screw 100 has a small extension 102 concentric therewith which is designed to engage a recess 103 in the die plate 94 as shown in FIG. 9. As shown in FIG. 10, the number of turns per unit length of the feed screw 100 increases in the direction toward the front of the screw 100; or in other words, in the direction towards the die plate 94 when the feed screw 100 is properly installed in the housing 44. This feature reduces the amount of power which must be supplied to the feed screw 100 in order to press mixed and kneaded paste through the aperture 94a in the die plate 94. In instances where the apparatus shown is used for preparing pasta, a very thick paste is used and this reduction of the required power permits the use of a lighter duty, and thus less expensive, motor and gear means for the aparatus.

Figure 11:
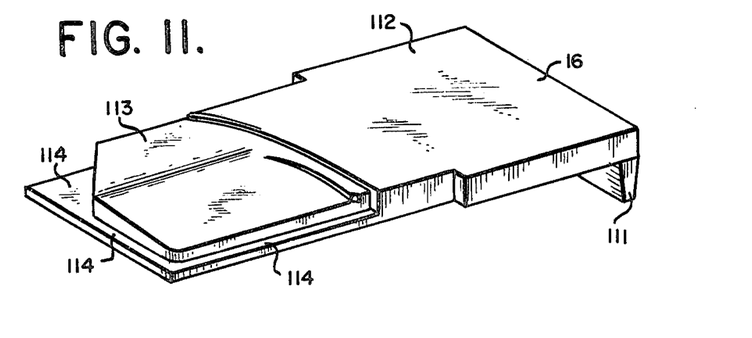
FIG. 11 is a perspective view of a closure means used in the present apparatus for separating the mixing and kneading chamber from the extrusion chamber.

Referring now to FIG. 11, a closure 16, in the form of a plate, is slidably inserted between the vessel 19 and the extrusion housing 44 for preventing communication therebetween. The closure means 16 includes a downwardly extending lip 111 for allowing easy gripping of the closure means 16 to remove it from its closed position. The closure means 16 has a first upper surface portion 112 and a second upper surface portion 113. The surface portion 113 is slightly lower than the portion 112 and is flush with the top surface of the bottom 23 of the vessel 19 when properly installed. The closure means 16 also includes an upwardly facing flange 114 around three sides of the upper surface portion 113. The flange 114 fits under the bottom of the vessel 19 when the closure means 16 is inserted in the housing. The configuration of the four sides of the upper surface portion 113 is designed to closely fit the configuration of the discharge port 24 in the bottom 23 of the vessel 19 to prevent passage of paste from the vessel to the extruder.

Figure 12:
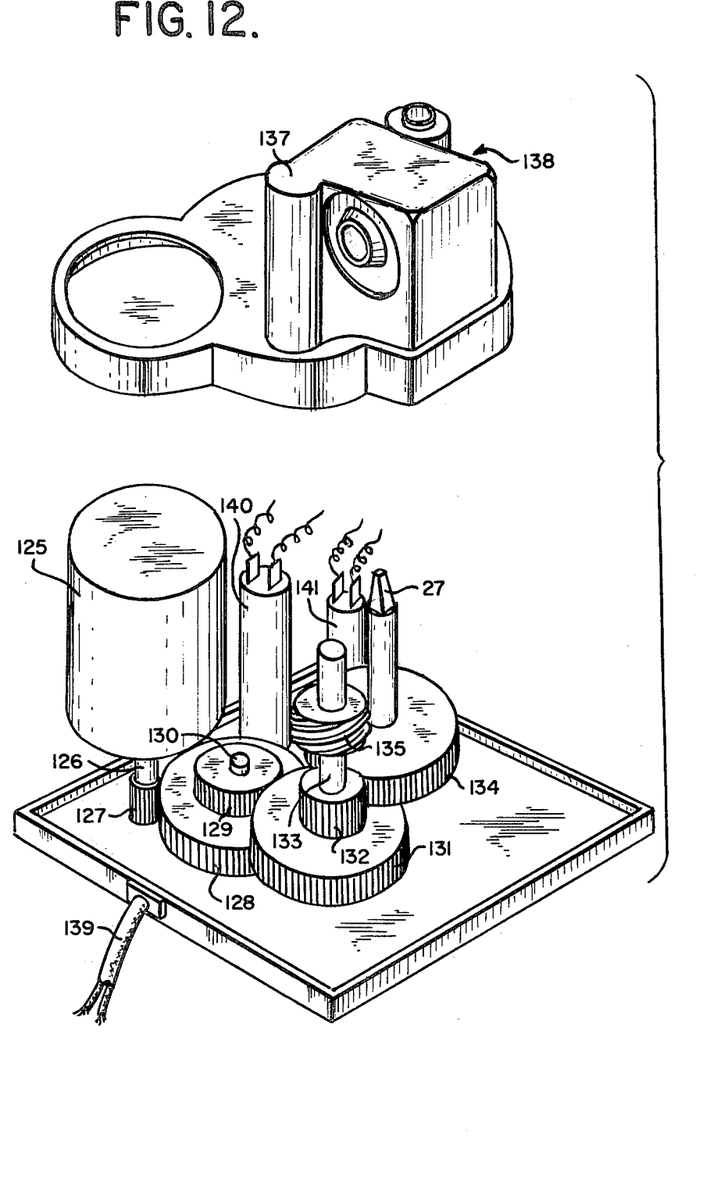
FIG. 12 is a partially exploded perspective view of a motor and gear arrangement suitable for use with the apparatus of FIGS. 1 and 2.

FIG. 12 shows a partially exploded view of a motor and gear means suitable for use with the presently described apparatus. The motor and gear means are mounted on the base 12 and include an electric motor 125 and various shafts and gears 126–135. The shaft 126 extending from the motor 125 is turned thereby and through gear 127, engages gear 128. Gears 128 and 129 are affixed together and are mounted on a shaft 130 for simultaneous rotation. A gear 131, which is affixed to shaft 133 secured to and extending upwardly from base 12, engages gear 129. Gears 132 and 135 are also affixed to shaft 133. The gear 132 engages another gear 134 which is affixed to the rotatable member 27 on which the blade means 30 of FIG. 2 is rotatably mounted on the base 12, as previously described. A worm gear 135 is fixedly mounted on the shaft 133 and is turned thereby in accordance with the rotation of gear 131. The worm gear 135 has a complementary gear (not shown) mounted within the gear means cover 137. This complementary gear is engageable with the feed screw 100 of FIG. 10 when the extension 101 of the blade 100 is inserted through a hole, generally designated 138 and located in the opposite side of the gear means cover 137. In this manner, rotational force is supplied to the feed screw 100. Electrical power is connected to the apparatus 10 through the electrical cable 139. The motor 125 and its associated circuitry (not shown except for capacitors 140 and 141, ON/OFF switch 18 of FIG. 1 and the safety switch 48 of FIG. 2) are operatively connected to operate the motor 125 in a given or forward direction. In order for the motor 125 to operate, the switch 18 must be in the "ON" position and the safety switch 48 must be activated such as by the lock means 47 on the cover 13. Thus, the motor 125 and the described gear means provide simultaneous rotation in the given direction to both the rotatable member 27 or shaft 31 and the feed screw 100.

Figures 13A, 13B:
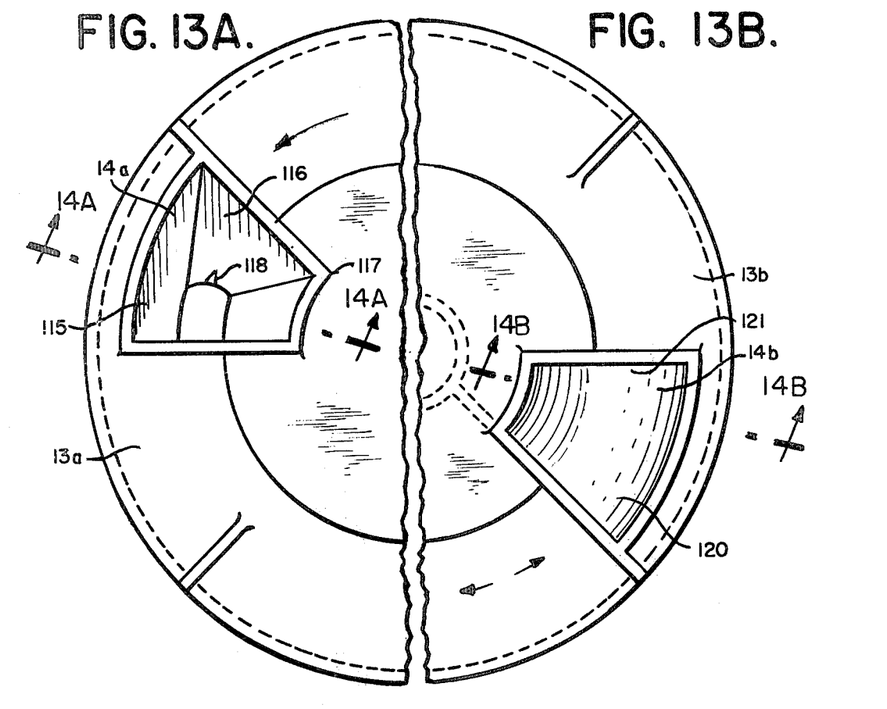
FIGS. 13A and 13B are partial top views of two covers, either of which may be used for covering the mixing and kneading chamber of the apparatus of FIGS. 1 and 2.
Figure 14A:
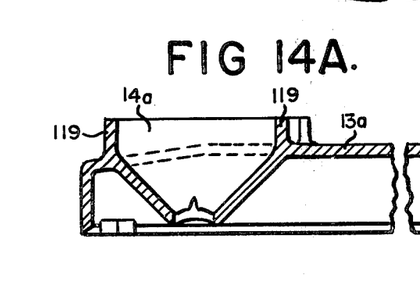
FIGS. 14A and 14B are sectional views of the covers of FIGS. 13A and 13B, respectively, taken along view lines 14A—14A and 14B—14B, respectively.

FIGS. 13A and 13B show top views of two covers 13a and 13b which may be used with the apparatus 10 of the present invention. As shown in FIG. 2, the cover 13 interfaces with the top of the vessel 19 to prevent the overflow of mixing ingredients during the operation of the apparatus 10. Each of the covers 13a and 13b has an inlet port 14a and 14b, respectively, located therein. The inlet ports 14a and 14b allow the addition of ingredients to the mixing chamber 20 during the operation of the unit without necessitating removal of the cover 13. The inlet port 14a which is also shown in a sectional view in FIG. 14A is basically composed of relatively flat surfaces 115, 116 and 117. An upwardly extending point 118 at the edge of the inlet port 14a is provided for breaking egg yolks as they enter the mixing chamber 20. The inlet port 14a also includes an upwardly extending circumferential wall 119 which rises from the top of the cover 13a to make the addition of liquids to the mixing chamber 20 easier.

Figure 14B:
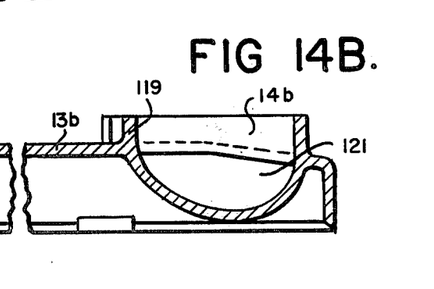

FIG. 13B shows that port 14b is slightly different from port 14a. The inlet port 14b is composed of a curved surface 120, having a port 121 at the end thereof. As shown in FIG. 14B, the inlet port 14b also includes an upwardly extending circumferential wall 119 to aid in the addition of liquids to the mixing chamber 20.

In operation, the apparatus of the present invention allows for the convenient and thorough preparation of various fresh food pastes and especially for farinaceous pastes such as those used for pasta which tend to be very thick and difficult to manage. In preparing the pastes, the cover 13 is removed and ingredients are added into the vessel 19. Generally, no premixing is necessary. The cover 13 is then replaced and the switch 18 is activated to turn the apparatus on. The blade means assembly 30 rotates thus rotating the various blades 37, 38 and 39 to mix the ingredients. As the kneading blade 37 rotates, ingredients are forced under its lower surface 59. This causes the trailing edge 62b to move upwardly, away from the bottom 23 and against the force applied by the biasing means thereof. Thus, the means biasing the trailing edge 62b towards the bottom 23 causes the kneading blade 37 to exert downward pressure on the paste forming ingredients between the lower surface 59 and the bottom 23. This downward pressure compresses those ingredients thus homogenizing the ingredients. Further, as the trailing edge 62b passes over ingredients on each turn of the assembly 30, the ingredients are released from the downward pressure of the blade 37) which tends to stretch the paste mixture) thereby further homogenizing it. The downward pressure exerted by the kneading blade 37 is also effective in breaking up the lumps of unmixed dough which are usually present in such paste mixtures. After the kneading blade has passed over any given ingredients and the assembly 30 continues to rotate, the scraper blade 39 moves past the same given ingredients. The scraper blade 39 releases any paste forming ingredients which may be stuck to the bottom 23 and raises the remaining ingredients, changing their orientation. During the next pass over those ingredients, the kneading blade 37 puts them under pressure with their new orientation. Thus, the scraper blade 39 enhances the homogenizing effect of the kneading blade 37. Throughout this mixing and kneading process, portions of the ingredients being moved by the assembly 30 catch on the protrusions 29 thus causing further agitation to the mixture.

When the mixing and kneading processes are completed, the closure means 16 is grasped and pulled from the apparatus 10 thereby opening the discharge port 24 to allow communication between the mixing chamber 20 and the extrusion means 15. As the kneading blade 37 continues to rotate, it pushes or forces ingredients through the discharge port 24. This function is especially useful when the food paste involved is very thick, such as with pastes used for making pasta since they will not readily pass through port 24 merely by the urging of gravity. As the mixed and kneaded paste is forced into the extrusion means 15 the feed screw 100 is simultaneously rotating and forces that paste from the port 24 towards the extrusion die means located at the opposite end of the extrusion housing 44. When the paste reaches the die plate 94, it is forced through the aperture 94a of that die plate and formed into the shape determined by that aperture.

Once a paste has been prepared, the apparatus 10 is designed to allow for easy cleaning. The cover 13 is easily removed for cleaning. The blade means assembly 30 may be removed by disconnecting the thumbscrew 32 from the top of the rotatable member 27 and simply pulling the assembly 30 upwards. Once removed, the entire assembly 30 is submersible for cleaning. With the assembly 30 removed, the vessel 19 may be removed by simply lifting upwardly thereon. The closure means 16 is easily removable for cleaning. The extrusion means 15 may be removed for cleaning by first removing the collar 96 from the threaded cylindrical extension 91. The die plate 94 is removed with the collar 96. With the collar and die plate 94 removed, the feed screw 100 can be slid axially from the bore 92. Once the feed screw 100 is removed, the extrusion housing 44 may be slid laterally from right to left, as shown in FIG. 2, to remove it from the bore 92. Once the feed screw 100 is removed, the extrusion housing 44 may be slid laterally from right to left, as shown in FIG. 2, to remove it from the housing 11. Thus removed, the entire extrusion housing 44 is submersible for cleaning. The housing 11 can normally be cleaned with a damp cloth. Also, to aid in the cleaning of the various removable parts and the housing 11, these parts can be made of any suitable material. One material which has been previously used is Nylon 666 which is produced by most major chemical manufacturers. Also, the cover 13 may be fabricated from any suitable clear plastic material to allow monitoring of the mixing and kneading process.

The preparation process described above and especially the kneading action performed by the kneading blade 37 has proven very effective in the preparation of thick farinaceous pastes, such as those used for making pasta. The downward pressure exerted by the kneading blade properly kneads the paste to produce the complete homogenization thereof. Also, the apparatus which produces the kneading is effective in minimizing the amount of power required. This is accomplished by using the force created by the biasing means to press the ingredients instead of using force directly from the motor means. If the kneading blade 37 passes over ingredients which are very thick, the trailing edge 62b moves upward and passes over those ingredients. Even though the force derived from the biasing means may not be strong enough to break up the entire thick mass, it can break off portions of it and thus completely break it up in the course of several passes. If the power for kneading was applied directly from the motor, there would either be a possibility of jamming the apparatus or the apparatus would have to be capable of producing a large power output which would necessarily increase its cost. The maximum power output of the present apparatus can be limited to that which is required to move the trailing edge 62b of the kneading blade 37, away from the bottom 23 to whatever height is necessary to pass over the immovable ingredients. Thus constructed according to the present invention, an effective and affordable apparatus can be produced for the normally small amounts of pastes prepared domestically.

It should be understood that the embodiment of the present invention described herein is intended to be illustrative and that various changes can be made to this embodiment by persons skilled in the art, without departing from the scope of the appended claims.

I claim:

1. In an apparatus for preparing fresh food paste from paste forming contents of the type including a vessel having a bottom and forming a mixing and kneading chamber for said paste forming contents, said vessel having a closed side wall of circular cross section which is symmetrical about a vertical axis passing centrally through said chamber, a rotatable member mounted within said chamber for rotation about said vertical axis, drive means for rotating said member in a given direction, blade means located in said mixing and kneading chamber and means operatively connecting said blade means to said rotatable member in a position extending away from said vertical axis, wherein the improvement comprises:

said blade means including a kneading blade extending into close confronting spaced relation with said side wall of said vessel and having a lower surface with leading and trailing edges defined by said rotation in a given direction, said trailing edge having a normal position adjacent said bottom and being moveable away from said bottom and said leading edge being positioned at a substantially greater distance from said bottom than said normal position of said trailing edge; and means for biasing said trailing edge towards said bottom for causing said kneading blade to exert downward pressure on paste forming contents between said lower surface of said kneading blade and said bottom during the rotation of said rotatable member to effect the kneading of said contents.

2. An apparatus according to claim 1, wherein said connecting means comprises an elongated support member operatively connected to said rotatable member in a position radially extending away from and perpendicular to said vertical axis, and means rotatably mounting said kneading blade on said elongated support member.

3. An apparatus according to claim 2, further comprising stop means for acting against said means for biasing said trailing edge to prevent the movement of said trailing edge beyond said normal position.

4. An apparatus according to claim 1, wherein said lower surface of said kneading blade is curved away from said bottom as said lower surface extends in the direction away from said trailing edge towards said leading edge.

5. An apparatus according to claim 1, wherein said blade means includes a scraper blade extending substantially radially of said vertical axis and in close proximity to said bottom of said vessel for dislodging paste from said bottom during rotation of said rotatable member.

6. An apparatus according to claim 1, wherein said blade means includes a plurality of mixing blades mounted by said connecting means to and extending outwardly from said rotatable member, each of said mixing blades having a surface sloping upwardly as it extends in said given direction of rotation of said rotatable member.

7. An apparatus according to claim 6, wherein each of said mixing blades is mounted generally perpendicularly to said vertical axis.

8. An apparatus according to claim 6, wherein each of said mixing blades extends outwardly from said rotatable member and upwardly.

9. An apparatus according to claim 6, wherein said side wall of said vessel is generally cylindrical and further wherein each of said mixing blades extends outwardly into close confronting spaced relation with said cylindrical wall.

10. An apparatus according to claim 6, further comprising a plurality of protrusions extending from the inside of said side wall of said vessel for cooperating with said mixing blades to mix the contents of said chamber.

11. An apparatus according to claim 1, further comprising means forming an extrusion chamber beneath said bottom of said vessel, said bottom having a discharge port located therein off of said vertical axis for allowing said kneading blade to push paste forming contents from said mixing and kneading chamber into said extrusion chamber.

12. An apparatus according to claim 11, wherein said extrusion chamber is formed by an extrusion housing having a straight and generally cylindrical bore located therein; and wherein said apparatus further comprises:

means located within said extrusion housing for receiving in said extrusion chamber paste forming contents from said mixing and kneading chamber passing through said discharge port;

extrusion die means located at one end of said cylindrical bore and having apertures therein; and means for pushing said received paste forming contents through said extrusion chamber and through said apertures in said extrusion die means for forming said received contents into a predetermined shape.

13. An apparatus according to claim 12, wherein said means for pushing is formed by a feed screw rotatably mounted in said extrusion chamber.

14. An apparatus according to claim 13, further comprising means for rotating said feed screw in a given direction simultaneously with said rotatable member.

15. An apparatus according to claim 11, further comprising removable means for closing said discharge port, said means for closing said discharge port thereby allowing for the mixing and kneading of the contents of said mixing and kneading chamber without the passage of said contents into said extrusion chamber and the removal of said means for closing allowing for the passage of the contents of said mixing and kneading chamber into said extrusion chamber after the mixing and kneading thereof.

16. An apparatus according to claim 11, further comprising a housing disengageably mounting said vessel and said means forming an extrusion chamber to allow the removal and cleaning thereof.

17. An apparatus for preparing fresh food pastes from paste forming contents, comprising:

a vessel having a bottom and forming a mixing and kneading chamber for said food paste forming contents, said vessel having a closed side wall which is symmetrical about a vertical axis passing centrally through said chamber;

a rotatable member mounted within said chamber for rotation about said vertical axis;

drive means for rotating said member in a given direction;

blade means located in said mixing and kneading chamber and means operatively connecting said blade means to said rotatable member in a position extending away from said vertical axis, said blade means including a kneading blade extending into close confronting spaced relation with said side wall and having a lower surface with leading and trailing edges defined by said rotation in a given direction, said trailing edge having a normal position adjacent said bottom and being moveable away from said bottom and said leading edge being positioned at a substantially greater distance from said bottom than said normal position of said trailing edge; and means for biasing said trailing edge towards said bottom for causing said kneading blade to exert downward pressure on paste forming contents passing between said lower surface and said bottom during the rotation of said rotatable member to effect the kneading of said contents.

18. An apparatus according to claim 17, wherein said means operatively connecting said blade means to said rotatable member includes a thumb screw removably engageable with said rotatable member for allowing removal of said blade means from said mixing and kneading chamber.

19. Apparatus for preparing fresh food paste from paste forming ingredients, said apparatus being of the type including a mixing vessel having a wall defined by a surface of revolution and another wall transverse to said first defined wall and forming a mixing and kneading chamber; drive means having a rotatable output shaft disposed along the central axis of said surface of revolution; a food paste extruder in juxtaposition with said chamber for extruding pastes formed within said mixing vessel; a passage extending through one of said walls defining said mixing vessel to said extruder for providing a path for pastes formed in said mixing vessel from said mixing vessel to said extruder; and blade means mounted on said output shaft of said drive means within said mixing vessel with said shaft about the central axis of the surface of revolution, wherein the improvement comprises:

said blade means being effective for mixing said ingredients, for kneading said mixed ingredients to form a paste and for forcing said paste out of said mixing vessel through said passage into said extruder; said blade means comprising a blade having one edge in close confronting relationship with one said wall defining said mixing vessel, said blade having another edge disposed further from said one surface than said one edge, said blade being configured and disposed for pressing said paste forming ingredients against said one wall to knead said paste and for exerting a force on food paste formed in said mixing vessel in the direction of said passageway for forcing said food paste into said passageway and toward said extruder.

20. Apparatus for preparing fresh food paste from paste forming ingredients, said apparatus being of the type including a mixing vessel having a wall defined by a surface of revolution and another wall transverse to said first defined wall and forming a mixing and kneading chamber; drive means having a rotatable output shaft disposed along the central axis of said surface of revolution; a food paste extruder in juxtaposition with said chamber for extruding pastes formed within said mixing vessel; a passage extending through one of said walls defining said mixing vessel to said extruder for providing a path for pastes formed in said mixing vessel from said mixing vessel to said extruder; and blade means mounted on said output shaft of said drive means within said mixing vessel with said shaft about the central axis of the surface of revolution, wherein the improvement comprises:

said blade means being effective for mixing said ingredients, for kneading said mixed ingredients to form a paste and for forcing said paste out of said mixing vessel through said passage into said extruder; said blade means comprising a blade having one edge in close confronting relationship with one said wall defining said mixing vessel, and of sufficient length to extend beyond said passage, said blade having another edge disposed further from said one surface than said one edge, said blade being configured and disposed for pressing said paste forming ingredients against said one wall to knead said paste and for exerting a force on food paste formed in said mixing vessel in the direction of said passageway for forcing said food paste into said passageway and toward said extruder.

21. An apparatus according to claim 19, wherein said kneading blade is mounted for pivotal movement relative to said shaft, and further comprising means for urging said blade in a direction to maintain said one edge of said blade closer to said one surface than the other edge of said blade.

22. An apparatus according to claim 21, further comprising stop means for limiting pivotal movement of said kneading blade to limit the approach of said one edge toward said one surface.

23. An apparatus according to claim 22, wherein said urging means is a spring.

* * * * *

REEXAMINATION CERTIFICATE (99th)

United States Patent [19]
Cavalli

[11] B1 4,219,318
[45] Certificate Issued Jun. 21, 1983

[54] APPARATUS FOR PREPARING FRESH FARINACEOUS PASTES

[76] Inventor: Alfredo Cavalli, 9 via Galileo Galilei, Pessano con Bornago, Milan, Italy

Reexamination Request
No. 90/000,230, Jul. 21, 1982

Reexamination Certificate for:
Patent No.: 4,219,318
Issued: Aug. 26, 1980
Appl. No: 10,089
Filed: Feb. 7, 1979

Related U.S. Application Data

[63] Continuation-in-part of Ser. No. 798,144, May 18, 1977, abandoned.

[30] Foreign Application Priority Data
May 19, 1976 [IT] Italy ............... 23392 A/76

[51] Int. Cl.³ ............................................. B29B 1/06
[52] U.S. Cl. ... 425/190; 366/98; 366/309; 366/314; 425/197; 425/205
[58] Field of Search ................ 425/200; 366/312, 326; 264/349

[56] References Cited

U.S. PATENT DOCUMENTS

| 509,987 | 12/1983 | Wilcox. | |
|---|---|---|---|
| 1,009,304 | 11/1911 | Harding | 366/312 |
| 1,345,542 | 7/1920 | Hartshorn | 366/311 |
| 2,026,667 | 1/1936 | Braibanti et al. | 425/205 |
| 2,368,977 | 2/1945 | Fasold | 366/312 |
| 2,844,110 | 7/1958 | Braibanti et al. | 425/190 |
| 3,284,059 | 11/1966 | Troy. | |
| 3,355,152 | 11/1967 | Otto | 366/314 |
| 3,406,643 | 10/1968 | Atkins, et al. | |
| 3,813,082 | 5/1974 | Manser. | |
| 3,963,220 | 6/1976 | Ohchi | 366/98 |

FOREIGN PATENT DOCUMENTS

| 453614 | 5/1925 | Fed. Rep. of Germany. |
|---|---|---|
| 687361 | 8/1930 | France. |
| 451958 | 10/1949 | Italy. |
| 564422 | 10/1957 | Italy. |
| 16891 | 7/1911 | United Kingdom. |
| 531536 | 1/1941 | United Kingdom. |
| 568094 | 3/1945 | United Kingdom. |

*Primary Examiner*—J. R. Thurlow

[57] ABSTRACT

In an apparatus for preparing fresh food paste of the type including a vessel having a bottom and forming a mixing and kneading chamber, the vessel having a closed side wall of circular cross section which is symmetrical about an axis passing centrally through the chamber, a rotatable member mounted within the chamber for rotation about the vertical axis, a drive for rotating the member in a given direction, blades located within the chamber and operatively connected to the rotatable member in a position extending away from the vertical axis, wherein the improvement comprises: the blades including a kneading blade extending into close confronting space relation with the vessel side wall and having a lower surface with leading and trailing edges defined by the given direction of rotation, the trailing edge having a normal position adjacent the vessel bottom and being movable away from the bottom and the leading edge being positioned at a substantially greater distance from the bottom than the normal position of the trailing edge; and a device for biasing the trailing edge towards the vessel bottom for causing the kneading blade to exert downward pressure on paste forming ingredients between the kneading blade's lower surface and the vessel bottom during the rotation of the rotatable member to effect the kneading of those ingredients.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claim 1 having been finally determined to be unpatentable, is cancelled.

Claims 2, 4–6, 11, 17, 19, and 20 are patentable as amended:

2. An apparatus according to claim [1] *5*, wherein said connecting means comprises an elongated support member operatively connected to said rotatable member in a position radially extending away from and perpendicular to said vertical axis, and means rotatably mounting said kneading blade on said elongated support member.

4. An apparatus according to claim [1] *5*, wherein said lower surface of said kneading blade is curved away from said bottom as said lower surface extends in the direction away from said trailing edge towards said leading edge.

5. [An apparatus according to claim 1] *In an apparatus for preparing fresh food paste from paste forming contents of the type including a vessel having a bottom and forming a mixing and kneading chamber for said paste forming contents, said vessel having a closed side wall of circular cross section which is symmetrical about a vertical axis passing centrally through said chamber, a rotatable member mounted within said chamber for rotation about said vertical axis, drive means for rotating said member in a given direction, blade means located in said mixing and kneading chamber and means operatively connecting said blade means to said rotatable member in a position extending away from said vertical axis, wherein the improvement comprises said blade means including a kneading blade extending into close confronting spaced relation with said side wall of said vessel and having a lower surface with leading and trailing edges defined by said rotation in a given direction, said trailing edge having a normal position adjacent said bottom and being moveable away from said bottom and said leading edge being positioned at a substantially greater distance from said bottom than said normal position of said trailing edge; and means for biasing said trailing edge towards said bottom for causing said kneading blade to exert downward pressure on paste forming contents between said lower surface of said kneading blade and said bottom during the rotation of said rotatable member to effect the kneading of said contents,* [wherein] *said blade means* [includes] *including* a scraper blade extending substantially radially of said vertical axis and in close proximity to said bottom of said vessel for dislodging paste from said bottom during rotation of said rotatable member.

6. An apparatus according to claim [1] *5*, wherein said blade means includes a plurality of mixing blades mounted by said connecting means to and extending outwardly from said rotatable member, each of said mixing blades having a surface sloping upwardly as it extends in said given direction of rotation of said rotatable member.

11. [An apparatus according to claim 1] *In an apparatus for preparing fresh food paste from paste forming contents of the type including a vessel having a bottom and forming a mixing and kneading chamber for said paste forming contents, said vessel having a closed side wall of circular cross section which is symmetrical about a vertical axis passing centrally through said chamber, a rotatable member mounted within said chamber for rotation about said vertical axis, drive means for rotating said member in a given direction, blade means located in said mixing and kneading chamber and means operatively connecting said blade means to said rotatable member in a position extending away from said vertical axis, wherein the improvement comprises said blade means including a kneading blade extending into close confronting spaced relation with said side wall of said vessel and having a lower surface with leading and trailing edges defined by said rotation in a given direction, said trailing edge having a normal position adjacent said bottom and being moveable away from said bottom and said leading edge being positioned at a substantially greater distance from said bottom than said normal position of said trailing edge; and means for biasing said trailing edge towards said bottom for causing said kneading blade to exert downward pressure on paste forming contents between said lower surface of said kneading blade and said bottom during the rotation of said rotatable member to effect the kneading of said contents, said apparatus* further comprising means forming an extrusion chamber beneath said bottom of said vessel, said bottom having a discharge port located therein off of said vertical axis for allowing said kneading blade to push paste forming contents from said mixing and kneading chamber into said extrusion chamber.

17. An apparatus for preparing fresh food pastes from paste forming contents, comprising:
 a vessel having a bottom and forming a mixing and kneading chamber for said food paste forming contents, said vessel having a closed side wall which is symmetrical about a vertical axis passing centrally through said chamber;
 a rotatable member mounted within said chamber for rotation about said vertical axis;
 drive means for rotating said member in a given direction;
 blade means located in said mixing and kneading chamber and means operatively connecting said blade means to said rotatable member in a position extending away from said vertical axis, said blade means including a kneading blade extending into close confronting spaced relation with said side wall and having a lower surface with leading and trailing edges defined by said rotation in a given direction, said trailing edge having a normal position adjacent said bottom and being moveable away from said bottom and said leading edge being positioned at a substantially greater distance from said bottom than said normal position of said trailing edge; and
 means for biasing said trailing edge towards said bottom for causing said kneading blade to exert downward pressure on paste forming contents passing between said lower surface and said bottom during the rotation of said rotatable member to effect the kneading of said contents, *said blade means including a scraper blade extending substantially radially of said vertical axis and in close proximity to said bottom of said vessel for dislodging paste from said bottom during rotation of said rotatable member.*

19. Apparatus for preparing fresh food paste from paste forming ingredients, said apparatus being of the type including a mixing vessel having a wall defined by a surface of revolution and another wall transverse to said first defined wall and forming a mixing and kneading chamber; drive means having a rotatable output shaft disposed along the central axis of said surface of revolution; a food paste extruder in juxtaposition with said chamber for extruding pastes formed within said mixing vessel; a pasage extending through one of said walls defining said mixing vessel to said extruder for providing a path for pastes formed in said mixing vessel from said mixing vessel to said extruder; and blade means mounted on said output shaft of said drive means within said mixing vessel with said shaft about the central axis of the surface of revolution, wherein the improvement comprises:

said blade means being effective for mixing said ingredients, for kneading said mixed ingredients to form a paste and for forcing said paste out of said mixing vessel through said passage into said extruder; said blade means comprising a blade having one edge in close confronting relationship with *said* one *of* said *walls* [wall] defining said mixing vessel, said blade having another edge disposed further from said one [surface] *of said walls* than said one edge, said blade being configured and disposed for pressing said paste forming ingredients against said one *of said walls* [wall] to knead said paste and for exerting a force on food paste formed in said mixing vessel in the direction of said passageway for forcing said food paste into said passageway and toward said extruder.

20. Apparatus for preparing fresh food paste from paste forming ingredients, said apparatus being of the type including a mixing vessel having a wall defined by a surface of revolution and another wall transverse to said first defined wall and forming a mixing and kneading chamber; drive means having a rotatable output shaft disposed along the central axis of said surface of revolution; a food paste extruder in juxtaposition with said chamber for extruding pastes formed within said mixing vessel; a passage extending through one of said walls defining said mixing vessel to said extruder for providing a path for pastes formed in said mixing vessel from said mixing vessel to said extruder; and blade means mounted on said output shaft of said drive means within said mixing vessel with said shaft about the central axis of the surface of revolution, wherein the improvement comprises:

said blade means being effective for mixing said ingredients, for kneading said mixed ingredients to form a paste and for forcing said paste out of said mixing vessel through said passage into said extruder; said blade means comprising a blade having one edge in close confronting relationship with *said* one *of* said *walls* [wall] defining said mixing vessel, and of sufficient length to extend beyond said passage, said blade having another edge disposed further from said one [surface] *of said walls* than said one edge, said blade being configured and disposed for pressing said paste forming ingredients against said one *of said walls* [wall] to knead said paste and for exerting a force on food paste formed in said mixing vessel in the direction of said passageway for forcing said food paste into said passageway and toward said extruder.

Claims 3, 7–10, 12–16, 18, and 21–23 dependent on amended claims, are determined to be patentable.

New claims 24–27 are added and determined to be patentable.

*24. An apparatus in accordance with claim 11, wherein said blade means includes a scraper blade extending substantially radially of said vertical axis and in close proximity to said bottom of said vessel for dislodging paste from said bottom during rotation of said rotatable member.*

*25. An apparatus in accordance with claim 19, wherein said blade means includes a scraper blade extending substantially radially of said central axis and in close proximity to said one of said walls for dislodging paste therefrom during rotation of said rotatable shaft.*

*26. An apparatus in accordance with claim 20, wherein said blade means includes a scraper blade extending substantially radially of said central axis and in close proximity to said one of said walls for dislodging paste therefrom during rotation of said rotatable shaft.*

*27. An apparatus for preparing fresh food paste from paste forming ingredients, said apparatus including a mixing vessel having a wall defined by a surface of revolution and another wall transverse to said first defined wall and forming a mixing and kneading chamber; drive means having a rotatable output shaft disposed along the central axis of said surface of revolution; a food paste extruder in juxtaposition with said chamber for extruding pastes formed within said mixing vessel; a passage extending through one of said walls defining said mixing vessel to said extruder for providing a path for pastes formed in said mixing vessel from said mixing vessel to said extruder; and blade means mounted on said output shaft of said drive means within said mixing vessel with said shaft about the central axis of the surface of revolution, said blade means being effective for mixing said ingredients, for kneading said mixed ingredients to form a paste and for forcing said paste out of said mixing vessel through said passage into said extruder; said blade means comprising a blade having one edge in close confronting relationship with said one of said walls defining said mixing vessel, said blade having another edge disposed further from said one of said walls than said one edge, said blade being configured and disposed for pressing said paste forming ingredients against said one of said walls.*

* * * * *